United States Patent
Verhagen et al.

(10) Patent No.: US 12,446,119 B2
(45) Date of Patent: *Oct. 14, 2025

(54) INDUCTION HEATING HEAD

(71) Applicant: Illinois Tool Works Inc., Glenview, IL (US)

(72) Inventors: Paul D. Verhagen, Appleton, WI (US); Tiffany Anne Carter, Appleton, WI (US); Alan Dale Sherrill, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1276 days.

This patent is subject to a terminal disclaimer.

(21) Appl. No.: 16/863,231

(22) Filed: Apr. 30, 2020

(65) Prior Publication Data

US 2020/0260535 A1 Aug. 13, 2020

Related U.S. Application Data

(63) Continuation of application No. 13/770,010, filed on Feb. 19, 2013, now Pat. No. 10,645,763.

(51) Int. Cl.
*H05B 6/10* (2006.01)
*H05B 6/14* (2006.01)
(Continued)

(52) U.S. Cl.
CPC .............. *H05B 6/101* (2013.01); *H05B 6/14* (2013.01); *H05B 6/365* (2013.01); *H05B 6/42* (2013.01)

(58) Field of Classification Search
CPC .......... H05B 6/101; H05B 6/14; H05B 6/365; H05B 6/42; Y02P 10/25
(Continued)

(56) References Cited

U.S. PATENT DOCUMENTS 2,672,544 A   3/1954   Finchelstein
2,743,345 A   4/1956   Seulen
(Continued)

FOREIGN PATENT DOCUMENTS

GB   2325982      12/1998
WO   01/30117     4/2001
(Continued)

OTHER PUBLICATIONS

IHS Floating Inductor and IHS Pinpoint Inductor, Proheat 35 Accessories, Red-D-Arc Welderrentals, www.reddarc.com/IHS.
(Continued)

*Primary Examiner* — Steven W Crabb
*Assistant Examiner* — Ket D Dang
(74) *Attorney, Agent, or Firm* — McAndrews, Held & Malloy, Ltd.

(57) ABSTRACT

An induction heating system includes a power source and an induction head. The converter output is at a voltage that is not greater than the voltage applied to the coil. The induction head includes a housing that houses a conductive coil disposed to induce heat in a workpiece and the coil is wound to be tuned to the output power. The coil is wound in a stacked spiral pattern with at least two turns in each layer. A flux concentrator is disposed about the coil with a potting compound around the concentrator and coil. Spacers maintain a desired separation between the head and the workpiece. The coil is a tube carrying a coolant. The head includes a wear surface that prevents contact of the coil and the workpiece, and a thermal insulator between the coil and wear surface. A non-contact temperature sensor is mounted to the housing.

16 Claims, 4 Drawing Sheets

(51) Int. Cl.
*H05B 6/36* (2006.01)
*H05B 6/42* (2006.01)

(58) Field of Classification Search
USPC ......................................................... 219/660
See application file for complete search history.

(56) References Cited

U.S. PATENT DOCUMENTS

| | | | | |
|---|---|---|---|---|
| 2,749,423 | A | | 6/1956 | Bisterfeld |
| 3,005,893 | A | * | 10/1961 | Dixon .................... B23K 1/002 |
| | | | | 219/616 |
| 3,256,417 | A | | 6/1966 | Merrett |
| 3,414,698 | A | | 12/1968 | Bedford |
| 3,520,053 | A | | 7/1970 | Hinton |
| 3,659,069 | A | | 4/1972 | Balzer |
| 3,842,234 | A | | 10/1974 | Seyfried |
| 3,961,151 | A | * | 6/1976 | Danner ..................... H01F 5/06 |
| | | | | 219/676 |
| 3,989,916 | A | * | 11/1976 | Amagami ............... H05B 6/065 |
| | | | | 219/622 |
| 4,123,305 | A | | 10/1978 | Krzeszowski |
| 4,388,510 | A | * | 6/1983 | Hughes .................... H05B 6/44 |
| | | | | 336/138 |
| 4,523,269 | A | | 6/1985 | Baker et al. |
| 4,549,057 | A | * | 10/1985 | Anderson ............... H05B 6/365 |
| | | | | 219/673 |
| 4,874,916 | A | | 10/1989 | Burke |
| 4,978,825 | A | * | 12/1990 | Schmidt .............. B29C 65/3668 |
| | | | | 156/274.2 |
| 5,025,125 | A | | 6/1991 | Peterson |
| 5,266,764 | A | | 11/1993 | Fox |
| 5,313,037 | A | | 5/1994 | Hansen |
| 5,329,085 | A | | 7/1994 | Cowell et al. |
| 5,450,305 | A | | 9/1995 | Boys |
| 5,630,958 | A | | 5/1997 | Stewart et al. |
| 5,686,006 | A | | 11/1997 | Gaspard |
| 5,690,851 | A | | 11/1997 | Yoshioka et al. |
| 5,999,774 | A | * | 12/1999 | Masuda .................. G03G 15/32 |
| | | | | 399/155 |
| 6,137,093 | A | | 10/2000 | Johnson, Jr. |
| 6,147,336 | A | | 11/2000 | Ushijima |
| 6,229,127 | B1 | | 5/2001 | Link |
| 6,265,701 | B1 | | 7/2001 | Bickel et al. |
| 6,509,555 | B1 | * | 1/2003 | Riess ..................... B23K 13/01 |
| | | | | 219/663 |
| 6,589,437 | B1 | * | 7/2003 | Collins ............. H01J 37/32458 |
| | | | | 216/68 |
| 6,875,966 | B1 | * | 4/2005 | Barber ...................... B23K 3/04 |
| | | | | 219/616 |
| 7,202,450 | B2 | | 4/2007 | Barber et al. |
| 8,360,125 | B2 | * | 1/2013 | Schwiese .......... B29C 66/53461 |
| | | | | 156/379.6 |
| 10,645,763 | B2 | * | 5/2020 | Verhagen ................. H05B 6/14 |
| 2001/0024152 | A1 | | 9/2001 | Miyazaki et al. |
| 2002/0017519 | A1 | * | 2/2002 | Takagi ............... G03G 15/2053 |
| | | | | 219/619 |
| 2004/0069774 | A1 | | 4/2004 | Markegard et al. |
| 2004/0226940 | A1 | | 11/2004 | Monda et al. |
| 2005/0000959 | A1 | | 1/2005 | Kagan |
| 2005/0103437 | A1 | | 5/2005 | Carroll |
| 2006/0237448 | A1 | | 10/2006 | Barber |
| 2007/0023422 | A1 | | 2/2007 | Obata |
| 2007/0246457 | A1 | * | 10/2007 | Tsueda .................. H05B 6/145 |
| | | | | 219/619 |
| 2008/0251642 | A1 | | 10/2008 | Boschet |
| 2009/0107991 | A1 | | 4/2009 | Mortimer |
| 2009/0255925 | A1 | | 10/2009 | Chirico |
| 2010/0295412 | A1 | | 11/2010 | Matsumoto |
| 2011/0011750 | A1 | | 1/2011 | Lovens |
| 2011/0297668 | A1 | | 12/2011 | Swanson |
| 2012/0154101 | A1 | | 6/2012 | Miyashita |

FOREIGN PATENT DOCUMENTS

| | | |
|---|---|---|
| WO | 2008/010833 | 1/2008 |
| WO | WO 2012006674 | 1/2012 |

OTHER PUBLICATIONS http://www.millerwelds.com/pdf/spec_sheets/IN3-1.pdf. Mar. 2012.
http://www.millerwelds.com/pdf/spec_sheets/IN11-0.pdf. Mar. 2012.
International Search Report. dated Apr. 23, 2014. European Patent Office, Rijswijk, Netherlands.
First Chinese Office Action, dated Apr. 6, 2016, State Intellectual Property Office of the P.R.C. 100088 Beijing, China.
Second Chinese Office Action, dated Dec. 27, 2016, State Intellectual Property Office of the P.R.C. 100088 Beijing, China.
Office Action, dated Jun. 7, 2016, Canadian Intellectual Property Office, K2P 1P9, Ottawa Ontario Canada.

* cited by examiner

INDUCTION HEATING HEAD

RELATED APPLICATIONS

This is a continuation of, and claims the benefit of the filing date of, U.S. patent application Ser. No. 13/770,010, filed on Feb. 19, 2013 which issued as U.S. Pat. No. 10,645,763 on May 5, 2020.

FIELD OF THE INVENTION

The present disclosure relates generally to the art of induction heating. More specifically, it relates to using an induction head tuned to a power source.

BACKGROUND OF THE INVENTION

Induction heating may be used to preheat metal before welding. It is well known to weld large and relatively thick pieces of steel (or other material) together. For example, pipes are often formed by taking a flat piece of steel and rolling the steel. A longitudinal weld is then made along the ends of the rolled steel, thus forming a section of pipe. A pipe line may be formed by circumferential welding adjacent sections of pipe together. Other applications of welding relatively thick steel (or other material) include ship building, railroad yards, tanker trucks, or other higher strength alloy welding.

When welding such relatively thick steel (or other material) it is generally desirable to preheat the workpiece along the weld path. Pre-heating is used to raise the temperature of the workpiece along the weld path because the filler metal binds to the workpiece better when the weld path is heated, particularly when a high-alloy steel is being welded. Without preheating there is a greater likelihood that the filler metal won't properly bind with the workpiece, and a crack may form. Generally, the steel is preheated to about 300° F. prior to welding. Preheating is often used for heating steel having a thickness of more than about ½".

Generally, in the prior art, "rose buds" (gas fired flame torches), resistance "chicklets" or induction heating blankets are used to preheat the steel. The rosebuds are placed along the weld path, typically one rosebud on each side of the weld path, or one covering both sides of the weld path, every 3 to 6 feet. The rosebuds are left in place a relatively long period of time (for example up to two hours for 3" thick steel). After the weld path has been preheated, the rose buds are removed and the weld is performed before the weld path cools.

Induction heating blankets are used to preheat a weld by wrapping an induction blanket (an induction cable inside a thermally safe material), and inducing current in the workpiece. Induction heating can be a fast and reliable way to preheat, particularly on stationary workpieces. However, induction blankets are not particularly useful on moving workpieces, and some pipe welding applications have a fixed position welder with a pipe that moves or rotates past the weld location. Liquid cooled cables offer flexibility in coil configuration, but have similar issues with rotating pipes rolling up cables or wearing through the insulation.

Other methods of preheating a weld path include placing the entire workpiece in an oven (which takes as long as using a rosebud), induction heating, or resistance heating wires. When preheating with these alternatives in the prior art, the heating device is placed at one location on the weld path until that location is heated. Then the weld is performed and the heating device is moved.

A significant advance in the prior art was a system that can preheat "on the fly" just in advance of the weld. Such a system is described in U.S. Pat. No. 6,265,701 (hereby incorporated by reference), and is owned by the owner of this application. Prior art induction coils had a puck design (flat, single turn) or a helical design with one turn in each plane. Such a system requires that the coil match the output impedance of the power source for efficient induction heating. As described in U.S. Pat. No. 6,265,701, impedance matching was accomplished therein by changing capacitors inside the power source—i.e., the power source is tuned to the coil. It is not always desirable to have the power source components readily accessible in the field. Another solution has been to insert a matching transformer between the power source output and the induction head. The transformer steps down the output voltage to match impedances. However, these matching transformers can be expensive and result in a lower applied voltage to the coil.

Additionally, if preheating is done on the fly, and the workpiece is moving, there must be some way to hold the coil in the proper location. Some end users have made fixtures to hold coils in place relative to the desired heat zone. However, such fixtures can cause wear to the coils, do not provide a consistent coil-heat zone distance, they require matching transformers, they have inadequate coupling between the coil and the heat zone, they typically have a narrow heat zone that can overheat and discolor the surface of the material being heated, they do not work well with smaller diameter pipes, such as 8 inches, because the curve of the pipe results in decoupling at the edge of the heat zone, thereby reducing efficiency, they often use temperature sensitive crayons so the user can monitor the temperature but do not have temperature feedback for controlling the power source, and they are not typically expandable.

Accordingly, a system for preheating weld path is desirable. Preferably, such a system will be useful as a handheld system and/or be useful with a moving workpiece and stationary induction head. Also, such a system preferably does not require a matching transformer, or require the power source to be tuned to the coil, rather the coil is tuned to the power source. Also, such a system preferably maintains a constant coil-to-heat zone distance, and/or includes temperature feedback, and/or is expandable.

SUMMARY OF THE PRESENT INVENTION

According to a first aspect of the disclosure an induction heating head includes a conductive coil wound in one, two or more layers in a pancake spiral pattern with at least two turns in each layer.

According to a second aspect of the disclosure an induction heating head has a first face for holding near a workpiece to be heated, a conductive coil, a potting compound, a housing, a handle, and a plurality of spacers to maintain a desired separation between the first face and the workpiece. The conductive coil is disposed in the potting compound, and the flux concentrator is disposed about the conductive coil and the potting compound such that the flux is concentrated toward the first face. The housing houses the conductive coil and the potting compound. The handle is mounted to the housing such that induction head can be held while it is being used to heat. The spacers are mounted to the housing.

According to a third aspect of the disclosure an induction heating system includes a power source and an induction head. The power source receives input power and includes a converter having an RMS converter output voltage, and provides output power of at least 1 KW at the RMS converter output voltage. The induction head is coupled to the power output to receive the RMS converter output voltage. The induction head includes a housing that houses a conductive coil disposed to induce heat in a workpiece and the coil is wound to be tuned to the output power such that the conductive coil receives the RMS converter output voltage without the RMS converter output voltage being transformed to a lower voltage.

According to a first aspect of the disclosure an induction heating head having a first face disposed to be held near a workpiece to be heated includes a pancake conductive coil and a flux concentrator disposed about the conductive coil that concentrates flux toward the first face. The conductive coil is held in a fixed position with respect to the flux concentrator. The conductive coil and the flux concentrator are disposed in a housing.

Each layer has four turns and/or has a number of turns chosen to tune the head to a power source in various embodiments.

A flux concentrator is disposed about the conductive coil such that the flux is concentrated toward a first face of the induction head in another embodiment.

The conductive coil is a copper tube that carries a coolant in another embodiment.

The conductive coil is disposed in a potting compound and/or the conductive coil and potting compound are disposed in the flux concentrator, and/or the first face is a wear surface that protects the coil (by being the point of contact when inadvertent contact with the workpiece is made), with a thermal insulator disposed between the coil and the wear surface and/or the conductive coil, the potting compound and the flux concentrator are disposed in a housing in various embodiments.

The housing includes one or more spacers, that can be wheels or other devices, mounted to the housing to maintain a desired separation between the first face and a workpiece in various embodiments.

A temperature sensor is mounted to the housing, and the sensor is a non-contact sensor or a contact sensor in various embodiments.

A handle is mounted to the housing, whereby the induction can be held while it is being used to heat in another alternative.

Other principal features and advantages of the disclosure will become apparent to those skilled in the art upon review of the following drawings, the detailed description and the appended claims.

Figure 1:
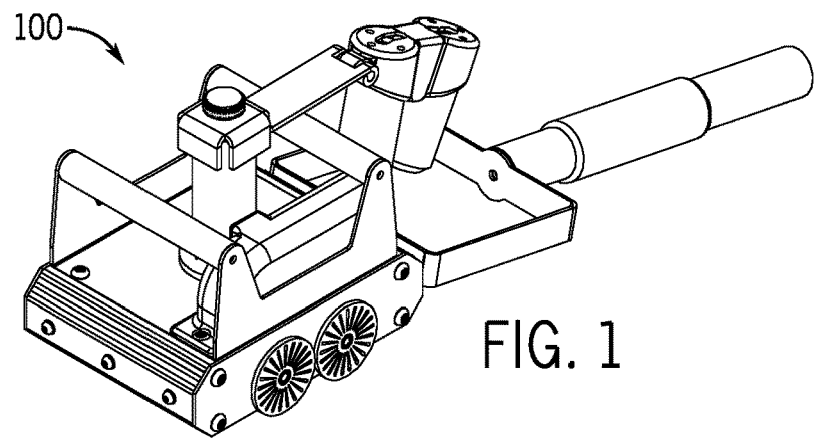
FIG. 1 is a perspective view of an induction head in accordance with the disclosure.

Before explaining at least one embodiment in detail it is to be understood that the disclosure is not limited in its application to the details of construction and the arrangement of the components set forth in the following description or illustrated in the drawings. The disclosure has other embodiments or ways of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to particular embodiments, it should be understood at the outset that the invention can be implemented with other systems, power sources and induction heads. Various embodiments include a an induction head, a system including both the head and the power supply, or a system including the head and the power supply and other devices such as fixtures, robotics, etc.

Generally, the present disclosure is an induction heating system including a power source and an induction head having a coil that is tuned to the power source. Induction heating system, as used herein, includes a power source that can provide power for induction heating, and an induction head that can induce heat in a workpiece. Power source, as used herein, is a source of power suitable for induction heating. A coil is tuned to the power source when it is capable of delivering a sufficient amount of power to the workpiece to adequately preheat the workpiece without using an impedance matching transformer while running within working output parameters (volts, amps and frequency) of the power source. Thus, the induction system described herein eliminates the need for a transformer disposed between the induction head and the power source.

Figure 4:
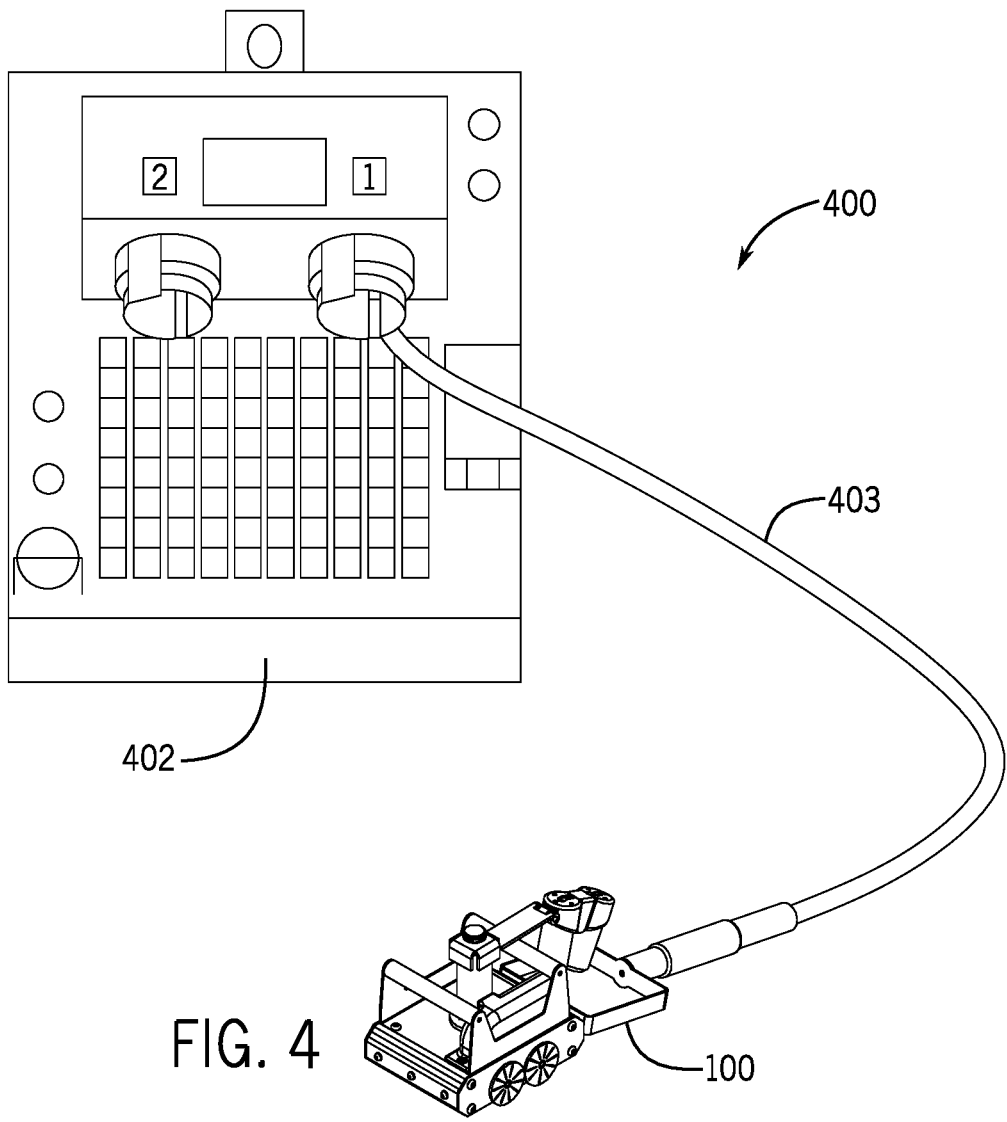
FIG. 4 is a diagram of an induction heating system in accordance with the disclosure.

FIG. 4 shows one embodiment of the disclosure—an induction heating system 400 including a power source 402, an induction power cable 403 and an induction head 100. Power source 402 provides an AC current to induction head 100, via cable 403. The AC current in head 100 produces an AC magnetic field which will induce eddy currents into the piece/material causing it to heat. As will be explained in greater detail below, head 100 includes a coil with a flux concentrator mounted in an enclosure. Alternatives include omitting the flux concentrator. Head 100 can be mounted on an adjustable arm or hand held and preferably includes a spacer to maintain a consistent distance to the material being heated. The coil has a compact multi-turn design and preferably can accommodate a range of pipe diameters while providing a wide consistent heat zone. Additional heads can be connected to a single power source, or to multiple power sources, to heat a larger area. Also, if multiple heads are used, they can be mechanically linked to insure a consistent heating area. A temperature sensor is preferably used to provide temperature feedback to the power source to control and maintain heat input to a desired target temperature.

Figure 10:
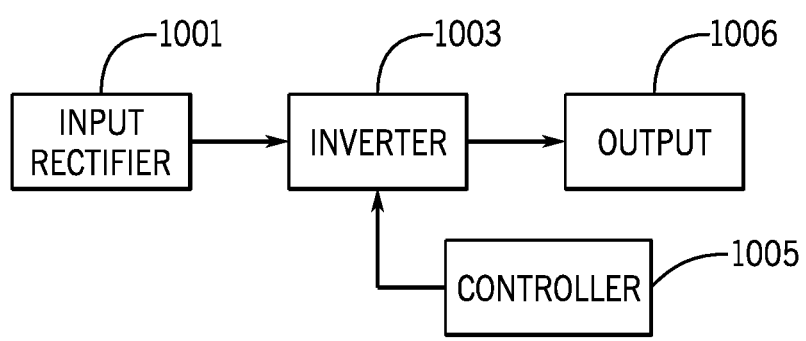
FIG. 10 is a diagram of an induction heating power supply in accordance with the disclosure.

Power source 402 is a Miller ProHeat 35® in the preferred embodiment, but can be other power sources capable of outputting sufficient power. Power source 402 includes a converter stage that provides an ac output having an RMS voltage that is applied to head 100. One example of power source 402 is shown in FIG. 10, and includes a rectifier input stage 1001, an inverter stage 1003, a controller 1005 and an output stage 1006. Other topologies and stages are used in other embodiments. Output stage 1006 does not include a matching transformer. Because neither power source 402 nor head 100 have a matching transformer, the RMS voltage applied to the coil in head 402 is not less than the RMS output voltage of inverter stage 1003. If converters other than an inverter are used, the RMS voltage applied to the coil in head 402 is still not less than the RMS output voltage of inverter stage 1003, so long as the coil is tuned to the power supply, and no matching transformer is used.

The Miller ProHeat 35® provides about 35 KW of output power at 700 volts RMS and 5-30 KHz (at 350 amps per output). The Proheat 35® can deliver partial power output to the workpiece if the output voltage or current limit is reached. The input may be 400-575V RMS. Larger or smaller power supplies, such as those providing 50 KW, 20 KW, or even as low as 1 KW, of output power, could also be used. The Miller ProHeat 35® includes connections for two power outputs, and one embodiment provides for multiple heads for a given power source. Another embodiment provides for a system with multiple power sources, each with their own head or multiple heads.

Cable 403 can be a prior art induction power cable, and provide for cooling fluid, temperature feedback, etc. Additional cables can be provided for temperature feedback, cooling, etc., or they can be integrated into cable 403. Power source 402 can provide the cooling fluid, or a separate cooling source may be used.

Figure 2:
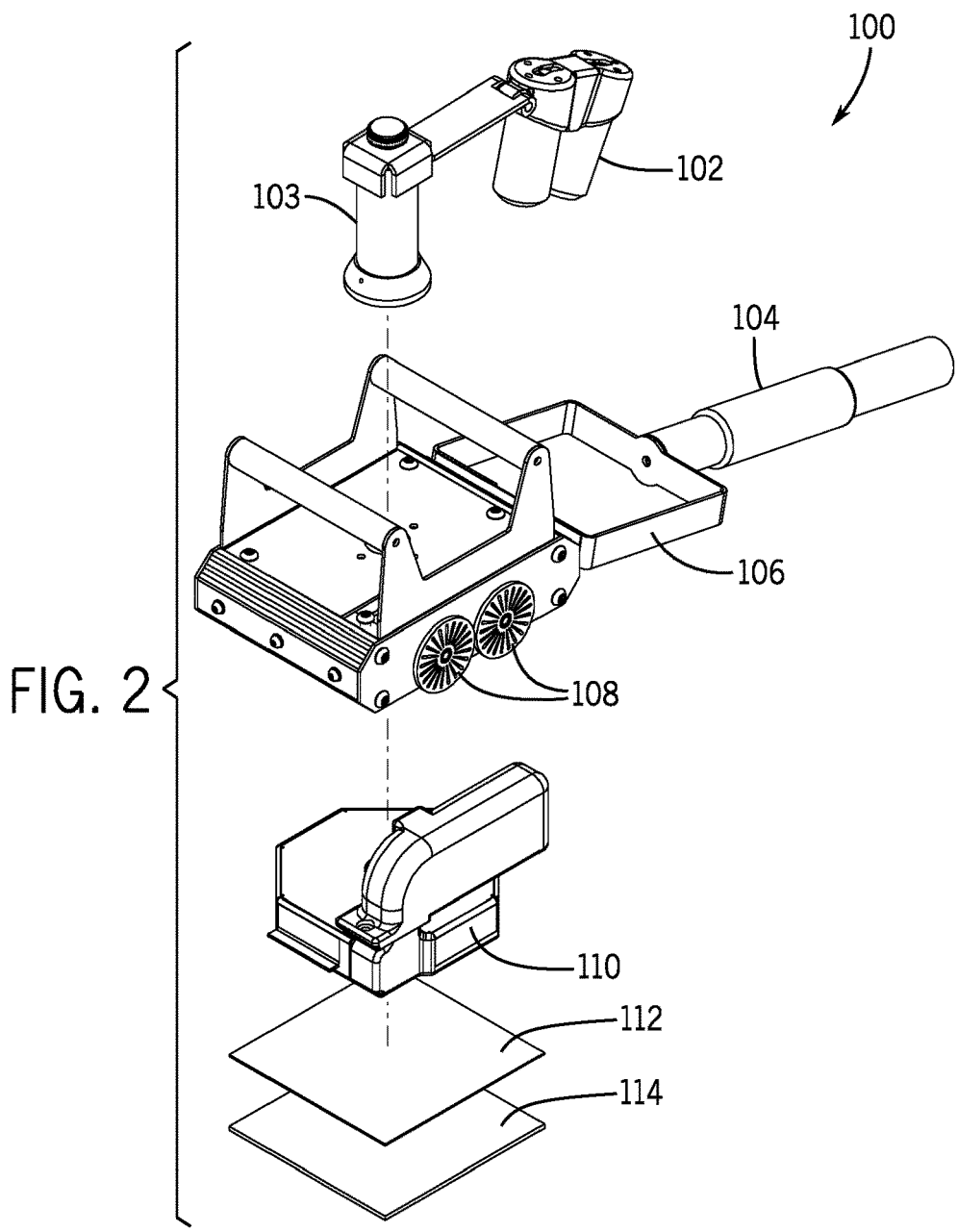
FIG. 2 is an expanded view of the induction head of FIG. 1.

Induction head 100 is shown in more detail in FIGS. 1 and 2. FIG. 1 is a perspective view of head 100, and FIG. 2 is an expanded view of head 100. Head 100 includes, in the preferred embodiment, temperature sensor 102, a handle grip 104, a mounting bracket 106, wheels or spacers 108, a housing 110, a thermal insulator 112, and an insulator and wear surface 114. Wear surface, as used herein, is a surface designed to protect the coil from incidental contact with the workpiece, without unduly wearing the surface, by being the point of contact when inadvertent contact with the workpiece is made. A wear surface can, but does not need to, provide thermal insulation. Handle grip 104 can be held by a person, a fixture or a robot. An alternative embodiment includes two wear surfaces, such as for heating two surfaces of a corner.

Temperature sensors 102 are preferably infrared (IR) temperature sensors that do not contact the workpiece. Sensors 102 can be rotated 180 degrees around a vertical post 103 to which they are attached to so that they are measuring the hottest temperature of material passing in either direction under the heating device, parallel to the mounting handle. The preferred embodiment of sensors 102 includes two different sensors to accurately read temperature across a spectrum of emissivity, because material surface preparation can result in a variety of surface emissivity from part to part or within a given part itself. The two sensors are preferably aligned on the same location of the material being heated. There is a pivot point between the arm and the sensors to allow the sensors to align on various sizes of pipe diameters. IR sensors 102 preferably have a field of vision "window" directly in line with the weld. Another embodiment provides for a single sensor mounted on the arm or mounted directly to the heating device in place of the vertical post. Other embodiments include temperature-sensitive crayons, temperature probes that contact the work piece, and thermocouples (wireless or wired).

Wheels or spacers 108 (including a pair that cannot be seen on the reverse side of head 100), are preferably positioned and sized to provide a relatively consistent coupling distance from the coil to the material being heated. They are preferably sized to accommodate a range of material diameters including small to large outside diameter, and flat and internal diameters. One embodiment includes alternate mounting hole locations that can incorporate different wheel positions and diameters to work on some smaller inside diameters. Another embodiment includes spacers that are not wheels and/or do not rotate, but rather slide across the surface of the workpiece.

Handle grip 104 is preferably molded from material such as ITW Devcon® Cable Cast®, Macromelt® or silicone. Hand Grip 104 is omitted in various embodiments. Mounting bracket 106 mounts the arm to the head. Housing 110 houses the induction coil and will be described in more detail below. Thermal insulator 112 may be comprised of any suitable insulating material. Insulator/wear plate 114 is preferably comprised of mica, ceramic or another insulating material that wears. Insulator/wear plate 114 may provide sufficient insulation that insulator 112 may be omitted. Or insulator/wear plate 114 may serve only as a wear plate, with all of the insulation coming from insulator 112 (which may be multiple layers). Insulator/wear plate 114 protects the insulator and coil from abrasion and possibly thermal damage. Bars are attached above on housing 110 for use in hand held applications.

Figure 3:
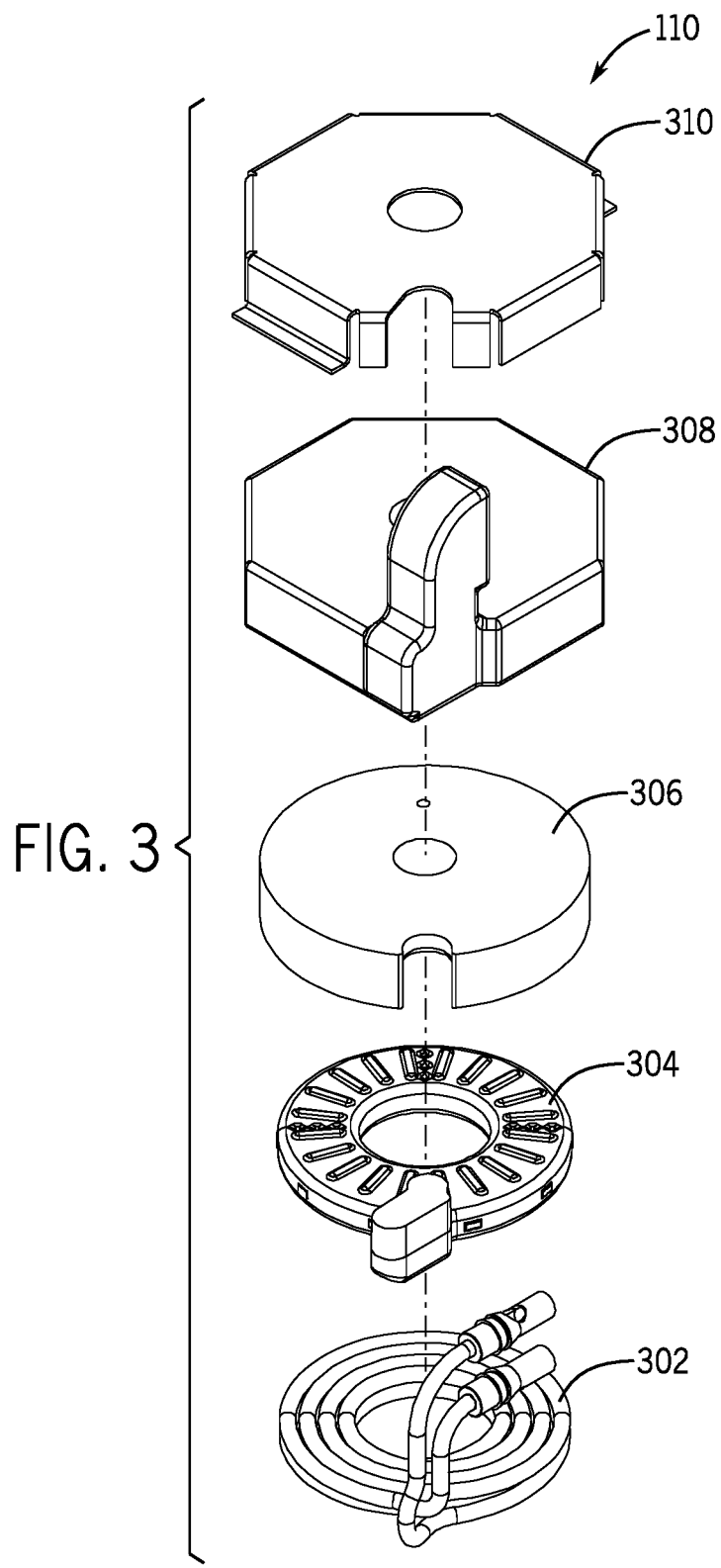
FIG. 3 is an expanded view of a portion of the induction head of FIG. 1.

Housing 110 is shown in FIG. 3 and is comprised of a shell or housing 310 and a thermally conductive potting compound 308, and houses a flux concentrator 306, a potting compound 304 and a conductive coil or tube 302. Coil or tube 302 is preferably comprised of copper, aluminum, or other conductive material. Shell 310 is preferably comprised of aluminum, although other materials may be used. Potting compounds 304 and 308 are preferably comprised of a thermally conductive material such as silicone. Alternatives provide that potting compounds 304 and 308 are other media or devices that spatially secure the coil with respect to the flux concentrator. Flux concentrator 306 is preferably a ferrite or a Fluxtrol® material. Other embodiments provide for using other materials. Flux concentrator 306 redirects the magnetic field from the top and sides of coil 302 toward the face of induction head 100 which is wear surface 114. Surface 114 is held in proximity with the material being heated. If two wear surface are provided, the coil can be bent to be near both surfaces, or parallel coils can be used, and two flux concentrators can be used.

Conductive tube 302 is comprised of copper and is wound in a stacked pancake spiral pattern having two layers and at least four turns in each layer, in the preferred embodiment. Fewer turns may be used for less power. Stacked spiral pattern for an induction coil, as used herein, is an induction coil wound with multiple spirals, each generally in a plane that is different from the others. Pancake spiral pattern for an induction coil, as used herein, is an induction coil wound in a spiral generally in a single plane. It also includes a coil with a bend in it, such as for use in a corner. The number of turns in a spiral pattern, as used herein, is the number of times the coil crosses a given line extending outward in one direction from the center of the spiral. Spiral pattern, as used herein, refers to a coil having a pattern wound about a center point, wherein the path taken from the outer most turn to the inner most turn results in the distance from the path to the center decreasing on average. Spiral pattern includes patterns where there are local variations from the decreasing distance, such as square spirals, oval spirals, distorted spirals, etc. Various embodiments provide for a coil having an outer diameter that is 4, 6, or 8 inches. One embodiment provides for a single pancake spiral pattern coil. Other embodiments provide for other patterns and sizes, and/or using a conductive material other than copper (aluminum, e.g.). Copper coil 302 carries a coolant within the hollow tube, in the preferred embodiment.

The preferred embodiment stacked spiral pattern with four turns was chosen because it is tuned to the particular power source chosen, and it is compact and delivers the desired heat to the workpiece. Generally, the coil design should be chosen such that the coil is tuned to the power source used. Because coil 302 is tuned to power source 402, system 400 does not require a transformer between head 100 and power source 402, that steps down the voltage, and can connect directly to power source 402 without the added cost, size and weight of a transformer. Thus, the RMS voltage applied to coil 302 is not less than the RMS voltage of the output of the converter in power source 402.

The multi turn design of coil 302 helps distribute heat more evenly across the heat zone and the compact coil design, including the two layer stacked aspect, helps keep the footprint of head 100 small. A small diameter copper tubing conductor, preferably a diameter of ¼ inch, offers sufficient coupling of the second layer into the material being heated. Other embodiments provide for other patterns and sizes, including a single layer spiral (not stacked), an eight turn double stacked coil, a coil having a different diameter, a coil that is not hollow, a coil that is stranded, a coil made from material other than copper, a coil cooled by fluid in contact with (rather than inside of) the coil, such as fluid flowing within spaces in potting compound 304, as well as other patterns, sizes, shapes and designs. When choosing the coil design, the workpiece diameter should be considered. A shorter length coil provides better coupling on smaller diameter pipes since the coil edges are not decoupled to the extent a longer fixed coil would be decoupled.

Figure 8:
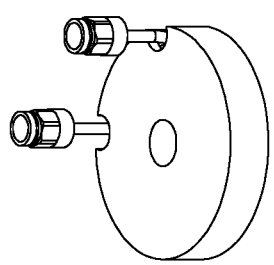
FIG. 8 is a flux concentrator in accordance with the disclosure.
Figure 6:
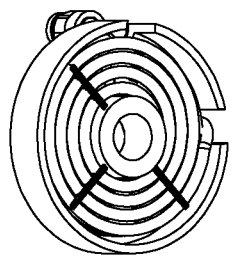
FIG. 6 is an expanded view of a portion of an induction head in accordance with the disclosure.
Figure 5:
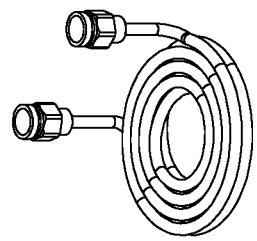
FIG. 5 is an induction coil in accordance with the disclosure.

FIG. 5 shows an alternative coil. The coil of FIG. 5 is a two-layer stacked spiral with four turns per layer, but has the connection arranged differently than coil 302. FIGS. 6 and 8 shows a flux concentrator with the coil of FIG. 5.

Figure 9:
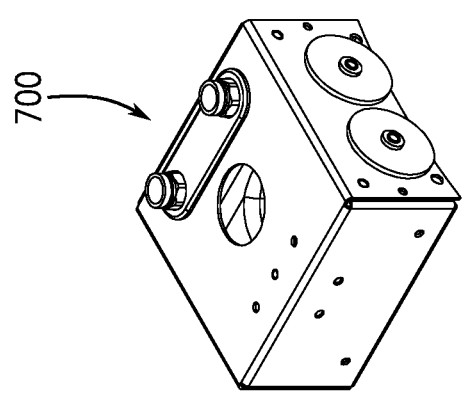
FIG. 9 is an assembled induction head in accordance with the disclosure.
Figure 7:
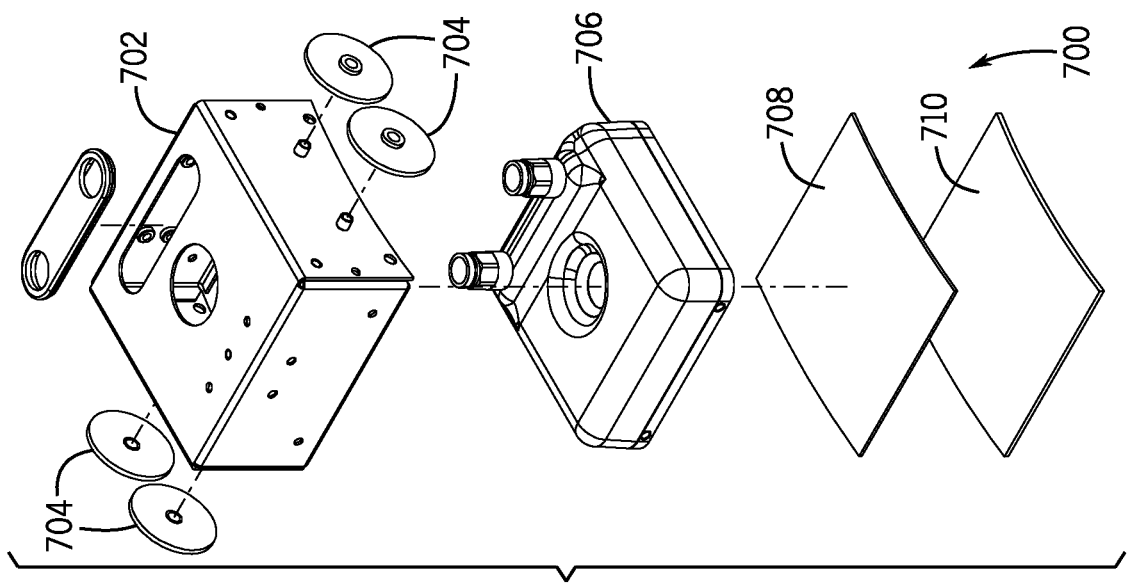
FIG. 7 is an induction coil and a flux concentrator in accordance with the disclosure.

FIG. 7 shows an expanded view of an induction head 700, including the coil and flux concentrator of FIGS. 5, 6 and 8. Induction head 700 includes, in this embodiment, a shell/housing 702, spacers/wheels 704, a potting compound 706, in which the coil and flux concentrator of FIGS. 5, 6 and 8 are disposed, a thermal insulator 708, and an insulator and wear surface 710. FIG. 9 shows induction head 700 assembled.

Numerous modifications may be made to the present disclosure which still fall within the intended scope hereof. Thus, it should be apparent that there has been provided in accordance with the present disclosure a method and apparatus for induction heating that fully satisfies the objectives and advantages set forth above. Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which and exclusive property or privilege is claimed are defined as follows:

1. An induction heating head comprising:
a conductive coil, wherein the conductive coil is wound in a stacked pancake spiral pattern having at least two layers and at least two turns in each layer to induce heat in a workpiece, wherein each layer is wound in a spiral pattern in a single plane;
a flux concentrator, disposed on a first face of the conductive coil and around a circumference of the conductive coil, whereby the flux concentrator concentrates flux toward a second face of the induction head opposite the first face, and wherein the conductive coil is held in a fixed position with respect to the flux concentrator, and wherein the second face is comprised of a wear surface disposed to prevent the coil from contacting the workpiece; and
a thermal insulator disposed between the coil and the wear surface.

2. The induction heating head of claim 1, wherein each layer has at least four turns and the conductive coil is a copper tube that carries a coolant.

3. The induction heating head of claim 1, wherein each layer has a number of turns chosen to tune the head to a power source.

4. The induction heating head of claim 1, further comprising at least one spacer disposed to maintain a desired separation between the first face and the workpiece.

5. The induction heating head of claim 4, further comprising a temperature sensor mounted to the housing.

6. The induction heating head of claim 5, wherein the temperature sensor is a non-contact temperature sensor.

7. An induction heating head, having a first face disposed to be held near a workpiece to be heated, comprising:
a conductive coil, wherein the conductive coil is comprised of copper and is wound in a stacked spiral pattern having two layers and at least two turns in each layer, wherein each layer is wound in a spiral pattern in a single plane;
a housing, in which the conductive coil is disposed;
a flux concentrator, disposed on a second face of the conductive coil opposite the first face and around a circumference of the conductive coil, whereby the flux concentrator concentrates flux toward the first face of the induction head, and wherein the conductive coil is held in a fixed position with respect to the flux concentrator; and
a plurality of spacers mounted to the housing disposed to maintain a desired separation between the first face and the workpiece.

8. The induction heating head of claim 7, wherein the conductive coil is a tube that carries a coolant.

9. The induction heating head of claim 8, wherein each layer has a number of turns chosen to tune the head to a power source.

10. The induction heating head of claim 9, further comprising a non-contact temperature sensor mounted to the housing.

11. The induction heating head of claim 7, wherein the first face comprises at least one of a thermal insulator and a wear surface disposed to prevent contact of the coil and the workpiece, and further comprising a handle, mounted to the housing, whereby the induction head is held while it is being used to heat.

12. An induction heating system, comprising:
a switched power source having a converter that provides a converter output of at least 1 KW at root mean square converter voltage; and
an induction head, coupled to the power source to receive the converter output at the RMS converter voltage, wherein the induction head includes a housing, and within the housing, a conductive coil disposed to induce heat in a workpiece and wound to be tuned to the converter output, wherein the conductive coil is comprised of copper and is wound in a stacked spiral pattern having two layers and at least two turns in each layer, wherein each layer is wound in a spiral pattern in a single plane, and whereby the conductive coil receives the root mean square converter voltage without the root mean square converter voltage being transformed to a lower voltage, wherein the induction head further comprises a flux concentrator, disposed on a first face of the conductive coil and around a circumference of the conductive coil, whereby the flux concentrator concentrates flux toward a second face of the induction head opposite the first face, and wherein the conductive coil is held in a fixed position with respect to the flux concentrator.

13. The induction heating system of claim 12, wherein the conductive coil and the flux concentrator are disposed in the housing.

14. The induction heating system of claim 13, wherein the housing includes at least one spacer disposed to maintain a desired separation between the second face and the workpiece.

15. The induction heating system of claim 14, further comprising a non-contact temperature sensor mounted to the housing, wherein the temperature sensor provides feedback to the power source.

16. The induction heating system of claim 12, wherein the second face comprises a wear surface disposed to prevent contact of the coil and the workpiece, and a thermal insulator disposed between the conductive coil and the wear surface and further comprising a handle, mounted to the housing, whereby the induction head is held while it is being used to heat.

* * * * *